(12) United States Patent
Kong (10) Patent No.: US 8,591,821 B2
(45) Date of Patent: Nov. 26, 2013

(54) COMBUSTION FLAME-PLASMA HYBRID REACTOR SYSTEMS, AND CHEMICAL REACTANT SOURCES

(75) Inventor: Peter C. Kong, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 930 days.

(21) Appl. No.: 12/428,604

(22) Filed: Apr. 23, 2009

(65) Prior Publication Data

US 2010/0270142 A1    Oct. 28, 2010

(51) Int. Cl.
*B01J 19/08* (2006.01)

(52) U.S. Cl.
USPC ........ 422/186; 422/186.21; 204/164; 373/18; 373/22; 219/121.57; 219/121.52; 219/121.36; 219/121.48

(58) Field of Classification Search
USPC ......... 204/164; 422/186, 186.21; 219/121.57, 219/121.52, 121.48, 121.36; 373/18–22
See application file for complete search history.

(56) References Cited

U.S. PATENT DOCUMENTS

| | | |
|---|---|---|
| 3,051,639 A | 9/1958 | Anderson |
| 3,123,464 A | 3/1964 | Casey et al. |
| 3,211,548 A | 10/1965 | Scheller et al. |
| 3,408,164 A | 10/1968 | Johnson |
| 3,429,691 A | 2/1969 | McLaughlin |
| 3,630,718 A | 12/1971 | Neuenschwander et al. |
| 3,738,824 A | 6/1973 | Davis et al. |
| 3,742,350 A | 6/1973 | White |
| 3,814,616 A | 6/1974 | Kondo et al. |
| 3,840,750 A | 10/1974 | Davis et al. |
| 3,914,573 A | 10/1975 | Muehlberger |
| 3,954,954 A | 5/1976 | Davis et al. |
| 3,992,193 A | 11/1976 | Fey et al. |
| 4,022,872 A | 5/1977 | Carson et al. |
| 4,080,194 A | 3/1978 | Fey |
| 4,107,445 A | 8/1978 | Wolf et al. |

(Continued)

FOREIGN PATENT DOCUMENTS

| | | |
|---|---|---|
| DE | 1142159 | 7/1960 |
| DE | 269157 A1 | 12/1987 |

(Continued)

OTHER PUBLICATIONS

Han et al "Synthesis of GaN-carbon composite nanobutes and GaN nanorods by arc discharge in nitrogen atmonsphere", Applied Physics Letters, vol. 76, p. 652-654).*

(Continued)

*Primary Examiner* — Xiuyu Tai
(74) *Attorney, Agent, or Firm* — TraskBritt (57) ABSTRACT

Combustion flame-plasma hybrid reactor systems, chemical reactant sources, and related methods are disclosed. In one embodiment, a combustion flame-plasma hybrid reactor system comprising a reaction chamber, a combustion torch positioned to direct a flame into the reaction chamber, and one or more reactant feed assemblies configured to electrically energize at least one electrically conductive solid reactant structure to form a plasma and feed each electrically conductive solid reactant structure into the plasma to form at least one product is disclosed. In an additional embodiment, a chemical reactant source for a combustion flame-plasma hybrid reactor comprising an elongated electrically conductive reactant structure consisting essentially of at least one chemical reactant is disclosed. In further embodiments, methods of forming a chemical reactant source and methods of chemically converting at least one reactant into at least one product are disclosed.

23 Claims, 4 Drawing Sheets

(56) References Cited

U.S. PATENT DOCUMENTS

| | | |
|---|---|---|
| 4,145,403 A | 3/1979 | Fey et al. |
| 4,146,389 A | 3/1979 | Karlovitz |
| 4,164,553 A | 8/1979 | Perugini et al. |
| 4,182,746 A | 1/1980 | Myint |
| 4,335,080 A | 6/1982 | Davis et al. |
| 4,347,060 A | 8/1982 | Blizzard et al. |
| 4,356,029 A | 10/1982 | Down et al. |
| 4,410,358 A | 10/1983 | Heshmatpour |
| 4,420,251 A | 12/1983 | James et al. |
| 4,472,621 A | 9/1984 | Blackmore |
| 4,529,974 A | 7/1985 | Tanaka et al. |
| 4,561,883 A | 12/1985 | Mullner et al. |
| 4,610,718 A | 9/1986 | Araya et al. |
| 4,612,045 A | 9/1986 | Shintaku |
| 4,677,371 A | 6/1987 | Imaizumi |
| 4,731,111 A | 3/1988 | Kopatz et al. |
| 4,736,157 A | 4/1988 | Betker et al. |
| 4,762,756 A | 8/1988 | Bergmann et al. |
| 4,772,315 A | 9/1988 | Johnson et al. |
| 4,783,216 A | 11/1988 | Kemp et al. |
| 4,801,435 A | 1/1989 | Tylko |
| 4,844,837 A | 7/1989 | Heck et al. |
| 4,851,262 A | 7/1989 | McFeaters |
| 4,875,810 A | 10/1989 | Chiba et al. |
| 4,891,066 A | 1/1990 | Shimotori et al. |
| 4,909,914 A | 3/1990 | Chiba et al. |
| 4,911,805 A | 3/1990 | Ando et al. |
| 4,926,165 A | 5/1990 | Lahlouh et al. |
| 5,015,958 A | 5/1991 | Masia et al. |
| 5,017,196 A | 5/1991 | Dewitz |
| 5,017,754 A | 5/1991 | Drouet et al. |
| 5,028,417 A | 7/1991 | Bhat et al. |
| 5,062,936 A | 11/1991 | Beaty et al. |
| 5,073,193 A | 12/1991 | Chaklader et al. |
| 5,194,128 A | 3/1993 | Beaty et al. |
| 5,195,046 A | 3/1993 | Gerardi et al. |
| 5,215,749 A | 6/1993 | Nicoll et al. |
| 5,257,500 A | 11/1993 | Venkataramani et al. |
| 5,279,148 A | 1/1994 | Brandes |
| 5,294,242 A | 3/1994 | Zurecki et al. |
| 5,369,366 A | 11/1994 | Piesinger |
| 5,401,464 A | 3/1995 | Lillybeck |
| 5,410,255 A | 4/1995 | Bailey |
| 5,416,280 A | 5/1995 | McDermott et al. |
| 5,486,313 A | 1/1996 | De Jong et al. |
| 5,538,706 A | 7/1996 | Kapoor et al. |
| 5,551,484 A | 9/1996 | Charboneau |
| 5,582,927 A | 12/1996 | Andricacos et al. |
| 5,602,492 A | 2/1997 | Cresswell et al. |
| 5,698,177 A | 12/1997 | Pratsinis et al. |
| 5,723,505 A | 3/1998 | Chaumette et al. |
| 5,733,941 A | 3/1998 | Waycuilis |
| 5,743,299 A | 4/1998 | Chick et al. |
| 5,749,937 A | 5/1998 | Detering et al. |
| 5,788,738 A | 8/1998 | Pirzada |
| 5,788,739 A | 8/1998 | Margulis |
| 5,851,507 A | 12/1998 | Pirzada et al. |
| 5,861,441 A | 1/1999 | Waycuilis |
| 5,861,600 A | 1/1999 | Jensen |
| 5,883,138 A | 3/1999 | Hershkowitz et al. |
| 5,886,056 A | 3/1999 | Hershkowitz et al. |
| 5,935,293 A | 8/1999 | Detering et al. |
| 5,984,997 A | 11/1999 | Bickmore et al. |
| 6,085,413 A | 7/2000 | Klassen et al. |
| 6,130,399 A | 10/2000 | Lu et al. |
| 6,187,226 B1 | 2/2001 | Detering et al. |
| 6,194,890 B1 | 2/2001 | Doyle et al. |
| 6,320,400 B1 | 11/2001 | Black et al. |
| 6,372,156 B1 | 4/2002 | Kong et al. |
| 6,379,419 B1 | 4/2002 | Celik et al. |
| 6,395,197 B1 | 5/2002 | Detering et al. |
| RE37,853 E | 9/2002 | Detering et al. |
| 6,501,278 B1 | 12/2002 | Arabi |
| 6,670,444 B2 | 12/2003 | Amendola et al. |
| 7,232,975 B2 | 6/2007 | Kong et al. |
| 7,354,561 B2 | 4/2008 | Kong |
| 2005/0022935 A1* | 2/2005 | Blalock et al. ........... 156/345.48 |
| 2005/0150164 A1 | 7/2005 | Wootan et al. |
| 2006/0078486 A1 | 4/2006 | Chin et al. |
| 2007/0235419 A1 | 10/2007 | Kong et al. |

FOREIGN PATENT DOCUMENTS

| | | |
|---|---|---|
| DE | 293704 A5 | 4/1990 |
| FR | 2341389 | 2/1977 |
| FR | 2603209 | 8/1986 |
| GB | 2217699 A | 11/1989 |
| GB | 2279009 A | 12/1994 |
| JP | S30-7408 | 8/1952 |
| JP | S38-6854 | 5/1963 |
| SU | 322960 | 2/1975 |
| SU | 223055 | 6/1982 |

OTHER PUBLICATIONS

PCT International Search Report and Written Opinion of the International Searching Authority for PCT/US10/20469, dated Apr. 12, 2010, 10 pages.

Down, M.G., "Titanium Production by a Plasma Process," Final Technical Report, Materials Laboratory, Air Force Wright Aeronautical Laboratories (#AD A 121892), May 1982, pp. i-60.

"The INEL Plasma Research Program," Idaho National Engineering Laboratory (BP422E-R0592-1M-T), May 1992, 3 pages.

McFeaters et al., "Application of Nonequilibrium Gas-Dynamic Techniques to the Plasma Synthesis of Ceramic Powders," In a book titled Combustion and Plasma Synthesis of High Temperature Materials, VCH Publications, 1990, pp. 431-445.

European Search Report from EP 02257291, dated Apr. 9, 2003, 3 pages.

Wu et al., "Review of Chemical Processes for the Synthesis of Sodium Borohydride," Millennium Cell Inc., Aug. 2004, pp. 1-24.

Krasnov et al., "Low Temperature Plasma in Mettalurgy," pp. 56-63, Oct. 16, 1974.

Tsvelkov et al., "Low Temperature Plasma in Recovery Processes," Academy of Science of the USSR, Institute of Metallurgy named after A.A. Baikov, pp. 169-177. (1980).

* cited by examiner

COMBUSTION FLAME-PLASMA HYBRID REACTOR SYSTEMS, AND CHEMICAL REACTANT SOURCES

GOVERNMENT RIGHTS

This Invention was made under a Cooperative Research and Development Agreement between Searles Valley Minerals Inc. and Battelle Energy Alliance, LLC under Contract No. DE AC05ID14517, awarded by the U.S. Department of Energy. The U.S. Government has certain rights in the invention.

CROSS-REFERENCE TO RELATED APPLICATIONS

This application is related to U.S. patent application Ser. No. 12/028,550, filed Feb. 8, 2008, now U.S. Pat. No. 8,287,814, issued Oct. 16, 2012, which is a divisional of U.S. patent application Ser. No. 10/992,498, filed Nov. 17, 2004, now U.S. Pat. No. 7,354,561, issued Apr. 8, 2008.

TECHNICAL FIELD

Embodiments of the present invention relate to reactors, such as combustion flame-plasma hybrid reactors, chemical reactant sources, and related systems and methods.

BACKGROUND

Plasma is generally defined as a collection of charged particles containing about equal numbers of positive ions and electrons and exhibiting some properties of a gas, but differing from a gas in that plasma is generally a good conductor of electricity and may be influenced by a magnetic field. A plasma may be generated, for example, by passing a gas through an electric arc. The electric arc will rapidly heat the gas by resistive and radiative heating to very high temperatures within microseconds of the gas passing through the arc. Essentially any gas may be used to produce a plasma in such a manner. Thus, inert or neutral gases (e.g., argon, helium, neon or nitrogen) may be used, reductive gases (e.g., hydrogen, methane, ammonia or carbon monoxide) may be used, or oxidative gases (e.g., oxygen, water vapor, chlorine, or carbon dioxide) may be used depending on the process in which the plasma is to be utilized.

Plasma generators, including those used in conjunction with, for example, plasma torches, plasma jets and plasma arc reactors, generally create an electric discharge in a working gas to create the plasma. Plasma generators have been formed as direct current (DC) generators, alternating current (AC) plasma generators, as radio frequency (RF) plasma generators and as microwave (MW) plasma generators. Plasmas generated with RF or MW sources may be referred to as "inductively coupled" plasmas. In one example of an RF-type plasma generator, the generator includes an RF source and an induction coil surrounding a working gas. The RF signal sent from the source to the induction coil results in the ionization of the working gas by induction coupling to produce a plasma. In contrast, DC- and AC-type generators may include two or more electrodes (e.g., an anode and a cathode) with a voltage differential defined therebetween. An arc may be formed between the electrodes to heat and ionize the surrounding gas such that the gas obtains a plasma state. The resulting plasma, regardless of how it was produced, may then be used for a specified process application.

In some applications, plasma reactors may be used for the high-temperature heating of material compounds to accommodate the chemical or material processing thereof. Such chemical and material processing may include the reduction and decomposition of hazardous materials. In other applications, plasma reactors have been utilized to assist in the extraction of a desired material, such as a metal or metal alloy, from a compound which contains the desired material.

As will be recognized by one of ordinary skill in the art, the creation of a plasma may require significant electrical power. Consequently, the use of plasmas in the production of various materials in commercial quantities is somewhat restricted in view of the costs attendant to purchasing the electricity and equipment necessary to produce the plasma and the other equipment to produce the product of interest.

Additionally, for certain chemical processes, chemical flame burners are used to combust a reactant for purposes of reacting it with another material in order to produce a resulting compound. These conventional flame burners, which are utilized in the industry, consume a significant amount of fuel, and air, to maintain the high operational temperatures that are necessary for these chemical reactions to occur.

Combustion flame-plasma hybrid reactors, such as described in U.S. Pat. No. 7,354,561 assigned to the assignee of the present invention, the disclosure of which is hereby incorporated herein in its entirety by reference, may utilize both a combustion flame and a plasma to facilitate the chemical conversion of a reactant to a product.

Although combustion flame-plasma hybrid reactors, such as those disclosed in U.S. Pat. No. 7,354,561, have been successful for uses such as the conversion of sodium borate to sodium borohydride, a chemical that is useful as a reducing agent in chemical and pharmaceutical processing and is a chemical of great interest for new energy storage and fuel cell applications, several technical issues remain unresolved. Additionally, several modifications and improvements to combustion flame-plasma hybrid reactors have also suffered from technical issues. For example, for some combustion flame-plasma hybrid reactors, the combustion flame cannot be established in the arc channel and it must be established externally first and then inserted into the arc channel. Also, significant water cooling of the modular plasma torch unit may be required and may result in a lower thermal efficiency for the system.

Additionally, the modular electrodes and the arc channel may be water-cooled components that may collect condensed water vapor, which may form from the combustion process. Condensed water on the electrode surfaces may create significant difficulties for arc ignition in the plasma unit, as it may increase the electrode break down potential significantly. In other words, a much higher voltage may be required in order to produce and maintain an arc between the electrodes when condensed water is present on the electrode surfaces. In view of this, only power supplies with very high voltages may be able to break down the electrodes with high artificial potential barriers and initiate an electric arc between the electrodes.

In order to use a normal voltage power supply, a temporary solution to the problem of water condensation on the electrodes may be shielding the water-cooled metal electrode surfaces with graphite inserts, as graphite is a conductive refractory material that may allow the surface of the electrode to exceed 100° C., which may prevent the condensation of water vapor thereon. Additionally, low ionization potential materials, such as sodium (Na), may be required to ignite the arc. However, the graphite inserts may react with combustion products, such as carbon dioxide ($CO_2$) and water ($H_2O$), and may be continuously consumed during operation. Furthermore, as the graphite inserts are consumed, the metal electrodes, such as tungsten alloy electrodes, may become exposed and the metal electrodes may also react with combustion products, such as $CO_2$ and $H_2O$, and be consumed. This may result in an unstable arc operation.

Another technical issue with combustion flame-plasma hybrid reactors involves the arc channel used to confine the arc column. For example, a sodium (Na) species in the arc may dissolve in the quartz of a water-cooled quartz tube that may form the arc channel, which may form a layer of soda glass on the tube surface. As a result, a material mismatch between the surface of the soda glass layer and the underlying quartz may cause the arc channel to crack and cooling water may leak into the arc channel and disrupt the arc.

In view of the foregoing, which should not be construed as admitted prior art, it would be advantageous to provide improved reactors, such as combustion-flame hybrid reactors, and related methods, devices and systems that address shortcomings in the art.

BRIEF SUMMARY

In some embodiments, a combustion flame-plasma hybrid reactor system may comprise a reaction chamber, a combustion torch positioned to direct a flame into the reaction chamber, and one or more reactant feed assemblies configured to electrically energize at least one electrically conductive solid reactant structure to form a plasma and feed each electrically conductive solid reactant structure into the plasma to form at least one product.

In additional embodiments, a chemical reactant source for a combustion flame-plasma hybrid reactor may comprise an elongated electrically conductive reactant structure consisting essentially of at least one chemical reactant. Additionally, the elongated electrically conductive reactant structure may be sized and configured to be fed through an opening into a reaction chamber by a feed assembly.

In further embodiments, a method of forming a chemical reactant source may comprise inserting a powder mixture comprising a first powdered chemical reactant and at least a second powdered chemical reactant into a container. The method may further comprise sintering the powder mixture to form an elongated electrically conductive chemical reactant structure.

In yet further embodiments, a method of chemically converting at least one reactant into at least one product may comprise directing combustion gases into a reaction chamber, forming a flame in the reaction chamber, forming a plasma in the reaction chamber, and gradually feeding at least one elongated electrically conductive reactant structure comprised of the at least one reactant into the plasma to chemically convert the at least one reactant to the at least one product.

DETAILED DESCRIPTION

The illustrations presented herein are not meant to be actual views of any particular device or system, but are merely idealized representations that are employed to describe various embodiments of the present invention. It is noted that elements that are common between figures may retain the same numerical designation.

Figure 1:
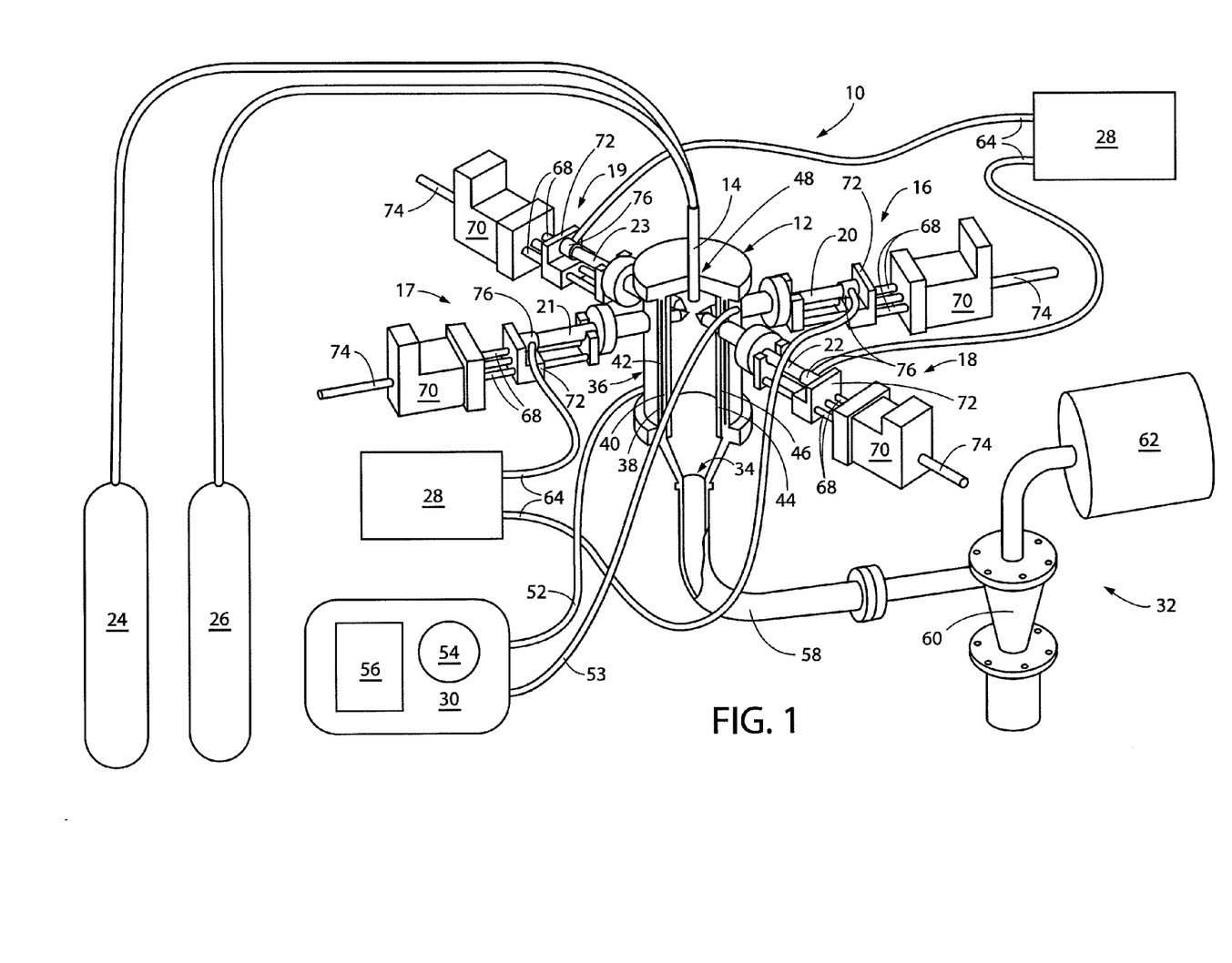
FIG. 1 shows an isometric view of a combustion flame-plasma hybrid reactor system that includes electrically conductive reactant structures in a planar arrangement, according to an embodiment of the present invention, and also shows a partial cross-sectional cutaway view of a reaction chamber of the combustion flame-plasma hybrid reactor to show an interior configuration of the reaction chamber.

An embodiment of a combustion flame-plasma hybrid reactor that addresses shortcomings in conventional plasma reactors and technical issues with proposed solutions is shown in FIG. 1. The combustion flame-plasma hybrid reactor 10 comprises a reaction chamber 12, a combustion torch 14, and at least one reactant feed assembly 16-19. Additionally, each reactant feed assembly 16-19 may be positioned outside of the reaction chamber 12 and may be coupled to a reactant structure 20-23, and each reactant structure 20-23 may extend into the reaction chamber 12. Additionally, the combustion torch 14 may be coupled to one or more combustion gas supplies 24 and 26, each reactant structure 20-23 may be coupled to a power supply 28, a cooling system 30 may be coupled to the reaction chamber 12, and a product collection system 32 may be coupled to an exit port 34 of the reaction chamber 12.

Figure 2:
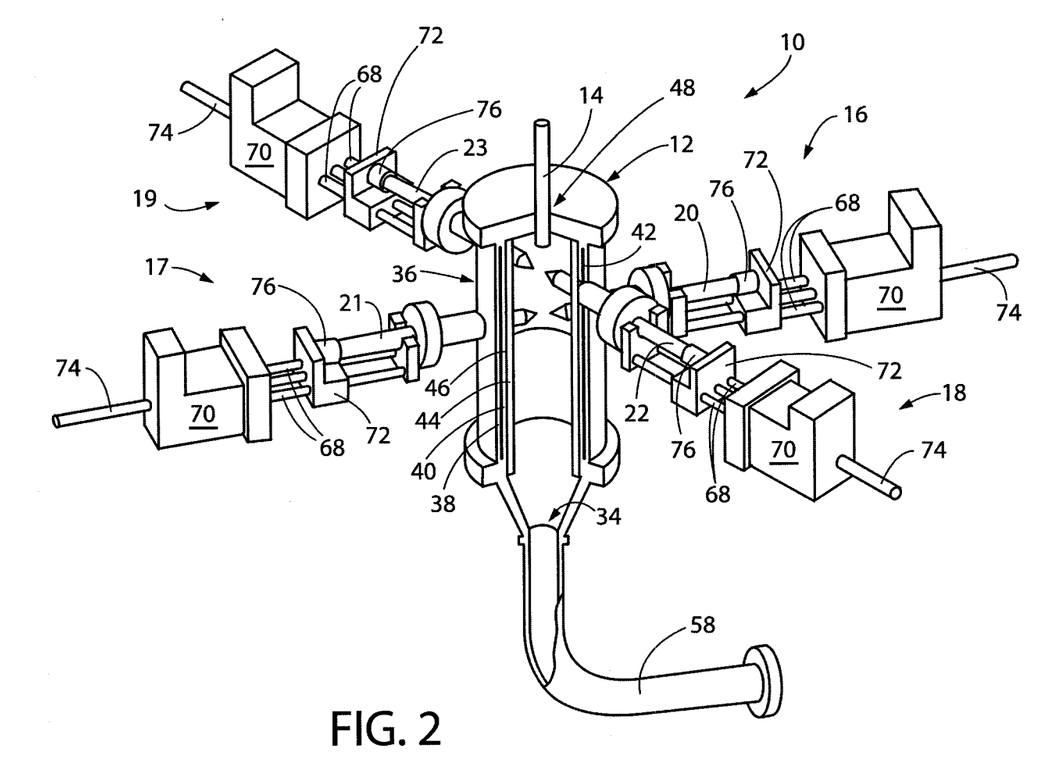
FIG. 2 shows an isometric view of a combustion flame-plasma hybrid reactor system that includes sets of electrically conductive reactant structures arranged at different longitudinal positions, according to an additional embodiment of the invention, and also shows a partial cross-sectional cutaway view of a reaction chamber of the combustion flame-plasma hybrid reactor to show an interior configuration of the reaction chamber.
Figure 3:
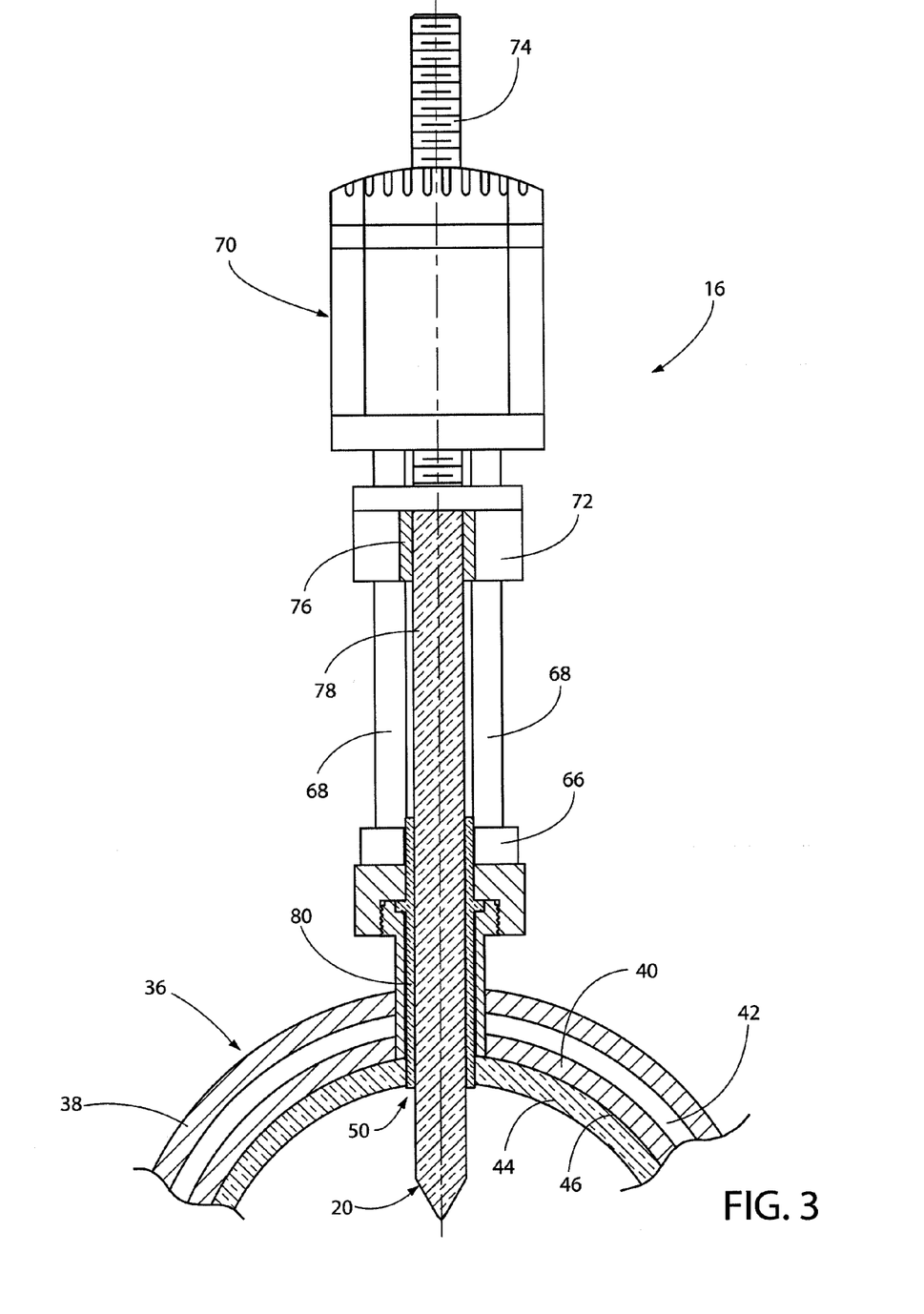
FIG. 3 shows a partial cross-sectional view of a reactant feed structure and a portion of the walls of a reaction chamber for a reactor, such as shown in FIGS. 1 and 2.

The reaction chamber 12 may comprise a longitudinally extending, double-walled enclosure 36 having an outer wall 38 and an inner wall 40, as shown in FIGS. 1 and 2 as well as FIG. 3, which shows a portion of a cross-section of the double-walled enclosure 36 of the reaction chamber 12 and a reactant structure 20 extending therethrough. The outer wall 38 and the inner wall 40 may define a coolant reservoir 42 therebetween, wherein a coolant, such as water or some other suitable fluid coolant, may be circulated to provide cooling to the double-walled enclosure 36 of the reaction chamber 12. Additionally, a thermally insulating lining 44 may substantially cover the inner surface 46 of the inner wall 40 of the double-walled enclosure 36 of the reaction chamber 12.

In some embodiments, the double-walled enclosure 36 of the reaction chamber 12 may form the sidewalls of the reaction chamber 12 and may be formed of a tubular outer wall 38 and a tubular inner wall 40 positioned within the tubular outer wall 38 and concentric to the tubular outer wall 38, and the tubular inner and outer walls 38 and 40, respectively, may form a generally annular coolant reservoir 42 therebetween. Additionally, the thermally insulating lining 44 may comprise a substantially tubular ceramic insert that may be positioned within and concentric to the tubular inner wall 40.

The reaction chamber 12 may further include an opening 48 configured to receive the combustion torch 14, which may be located at the top of the reaction chamber 12, a plurality of ports 50 (FIG. 3) configured to receive each of the reactant structures 20-23, which may extend through the double-walled enclosure 36 of the reaction chamber 12, and an exit port 34, which may be located at the bottom of the reaction chamber 12.

The cooling system 30 may include a plurality of cooling lines 52, 53 configured to circulate a cooling fluid through the coolant reservoir 42 of the reaction chamber 12. For example, a cooling fluid delivery line 52 may be used to direct the cooling fluid into the reservoir 42 at a location near the bottom of the reservoir 42 and to direct the cooling fluid into the reservoir 42 at an angle that is generally tangential to the reservoir 42 to facilitate a fluid flow within the reservoir 42 that may promote heat transfer to the cooling fluid. Similarly, a cooling fluid return line 53 may be positioned near the top of the reservoir 42 and may be used to facilitate the flow of cooling fluid out of the reservoir 42 at an angle generally tangential to the reservoir 42. A pump 54 may be employed to facilitate the circulation of the cooling fluid through the cooling lines 52, 53, through the reservoir 42 of the reaction chamber 12 and then back to a heat exchanger 56. The cooling fluid circulated through the cooling lines 52, 53 may transfer thermal energy away from the double-walled enclosure 36 of the reaction chamber 12, and optionally other components of the reactor 10. The cooling fluid may then flow through the heat exchanger 56, which may transfer at least a portion of the thermal energy accumulated by the cooling fluid away from the cooling fluid, and then the cooling fluid may be recirculated through the cooling lines 52, 53.

The heat exchanger 56 may be a counter-flow type heat exchanger, an ambient or forced air type heat exchanger, or some other type of heat exchanger, depending on various heat transfer requirements. Those of ordinary skill in the art will recognize that the heat exchanger 56, the pump 54 and other equipment associated with the cooling system 30 may be sized and configured in accordance with the amount of thermal energy that is to be removed from the reactor 10 and that various types of components may be utilized to facilitate such heat transfer.

As noted above, the reaction chamber 12 may include an exit port 34 from which products of chemical reactions therein may exit. The exit port 34 may be coupled to an outlet conduit 58 that may couple the reaction chamber 12 to additional processing equipment such as, for example, a cyclone 60 and a filter 62, for separating and collecting the materials processed through the reactor 10.

The combustion torch 14 may extend into the reaction chamber 12 through an opening 48 in the top of the reaction chamber 12 and may be positioned to direct a flame into the reaction chamber 12. The combustion torch 14 may be coupled to a fuel supply, such as a hydrocarbon fuel supply 24, and an oxygen supply 26, such as an air compressor or a commercially pure oxygen ($O_2$) supply. In some embodiments, the hydrocarbon fuel supply 24 may be a storage tank holding a compressed gas, such as methane, butane, propane, or some combination thereof. In additional embodiments, the hydrocarbon fuel supply 24 may be a compressed natural gas provided by a natural gas pipeline. In view of this, combustion gases, including a gaseous fuel and gaseous oxygen, may be delivered through the combustion torch 14 into the reaction chamber 12.

A plurality of reactant feed assemblies 16-19 may be coupled with the reaction chamber 12 and each may position a reactant structure 20-23 in spatial relation to the reaction chamber 12. Each reactant feed assembly 16-19 may be included in a set of reactant feed assemblies 16, 17 and 18, 19 that includes two or more reactant feed assemblies 16-19. Each set of reactant feed assemblies 16-19 may be positioned at substantially the same longitudinal position relative to the reaction chamber 12 as each other reactant feed assembly 16-19 of the set of reactant feed assemblies 16, 17 and 18, 19, and each reactor 10 may include a plurality of sets of reactant feed assemblies 16, 17 and 18, 19. For example, each set of reactant feed assemblies 16, 17 and 18, 19 may include two reactant feed assemblies 16, 17 and 18, 19 positioned at substantially the same longitudinal position relative to the reaction chamber 12 and positioned on opposing sides of the reaction chamber 12. In some embodiments, a plurality of sets of reactant feed assemblies 16, 17 and 18, 19 may each be positioned around the reaction chamber 12 at substantially the same longitudinal position relative to the reaction chamber 12 and may be generally arranged proximate a common plane, such as shown in FIG. 1. In additional embodiments, the reactor 10 may include multiple sets of reactant feed assemblies 16, 17 and 18, 19, each set of reactant feed assemblies 16, 17 and 18, 19 positioned at different longitudinal positions relative to the reaction chamber 12, such as shown in FIG. 2. Although the embodiments shown in FIGS. 1 and 2 each include four reactant feed assemblies 16-19, additional embodiments may include any number of reactant feed assemblies 16-19.

Each of the plurality of reactant feed assemblies 16-19 may be configured to adjust the position of a reactant structure 20-23 relative to a central axis of the reaction chamber 12 and each reactant feed assembly 16-19 may include an electric power conduit 64, which may electrically couple an electric power supply 28 to a reactant structure 20-23. Additionally, each set of reactant feed assemblies 16, 17 and 18, 19 may be electrically coupled to a separate electric power supply 28. In view of this, the electric power supplied to each set of reactant feed assemblies 16, 17 and 18, 19 may be controlled independently of the electric power supplied to any other set of reactant feed assemblies 16, 17 and 18, 19.

In some embodiments, as shown in FIG. 3, a reactant feed assembly 16 may include a coupling member 66, one or more guide rods 68, an actuator 70, a slidable frame member 72, and a drive rod 74. The coupling member 66 may be rigidly coupled to the reaction chamber 12 (FIGS. 1 and 2), the guide rods 68 may be rigidly coupled to the coupling member 66, and the actuator 70 may be rigidly coupled to the guide rods 68, such that the coupling member 66, guide rods 68 and actuator 70 may maintain a stationary position relative to the reaction chamber 12. The slidable frame member 72 may be slidably mounted to the guide rods 68 and may include a receiving structure 76 sized and configured to receive a reactant structure 20. The drive rod 74 may be coupled to the slidable frame member 72 and may extend through the actuator 70. The actuator 70 may be configured to move the drive rod 74 with an electric motor, such as by at least one of a step motor and a servo motor. In view of this, the actuator 70 may be configured to position the slidable frame member 72 along the one or more guide rods 68 and position the reactant structure 20 coupled thereto relative to the reaction chamber 12.

Each reactant structure 20-23 may be substantially solid (e.g., free of significant voids) and may be electrically conductive. Also, as shown in FIGS. 1-3, each reactant structure 20-23 may have a substantially cylindrical elongated body 78 that may be positioned by each reactant feed assembly 16-19 to extend from outside of the reaction chamber 12 into the reaction chamber 12. The reactor 10 may further include electrically insulating sleeves 80 positioned in the annular gap between each port 50 of the reaction chamber 12 and each reactant structure 20-23. For example, the electrically insulating sleeves 80 may be comprised of an electrically insulating ceramic material. Additionally, each reactant structure 20-23 may be formed of a material comprised essentially of at least one chemical reactant and sized and configured to be fed through a port 50 into the reaction chamber 12 by a reactant feed assembly 16-19. In view of this, each chemical component of each reactant structure 20-23, as well as the percentage of each component that forms the reactant structure 20-23, may be selected to contribute to a chemical reaction and at least a portion of the chemical composition of each of the chemicals that form the reactant structure 20-23 may form a portion of a chemical composition of at least one desired chemical product.

In some embodiments, the reactant structures 20-23 may be comprised of reactants that may be chemically reacted to form sodium borohydride. Such embodiments may include one or more reactant structures 20-23 comprising graphite and one or more reactant structures 20-23 further comprising a sodium borate, such as at least one of hydrated borax and hydrated metaborate. Additionally, some reactant structures 20-23 may further comprise sodium hydroxide. In one embodiment, one or more reactant structures 20-23 may consist essentially of graphite. In another embodiment, one or more reactant structures 20-23 may consist essentially of graphite and hydrated metaborate. In yet an additional embodiment, one or more reactant structures 20-23 may consist essentially of graphite, hydrated borax and sodium hydroxide.

In additional embodiments, the reactant structures 20-23 may be comprised of reactants that may be chemically reacted to form one or more carbides. Such embodiments may include reactant structures 20-23 comprising graphite and reactant structures further comprising an oxide, such as at least one of silicon oxide, titanium oxide, and zirconium oxide. One or more of the reactant structures 20-23 may consist essentially of graphite, and one or more of the reactant structures 20-23 may consist essentially of graphite and at least one of silicon oxide, titanium oxide, and zirconium oxide. In some embodiments, one or more reactant structures 20-23 may consist essentially of graphite and only one of silicon oxide, titanium oxide, and zirconium oxide.

In some embodiments, the reactant structures 20-23 may be formed by a method comprising inserting a powder mixture 82 (FIGS. 4 and 5) comprising a first powdered chemical reactant and at least a second powdered chemical reactant into a container and sintering the powder mixture to form each reactant structure 20-23. For example, the powder mixture 82 may comprise powdered graphite and at least a second powdered chemical reactant.

In some embodiments, the powder mixture 82 may comprise powdered graphite and powdered sodium metaborate. In additional embodiments, the powder mixture 82 may comprise powdered graphite, powdered borax, and powdered sodium hydroxide. In yet additional embodiments, the powder mixture 82 may comprise powdered graphite and at least one of powdered silicon oxide, powdered titanium oxide, and powdered zirconium oxide.

Figure 4:
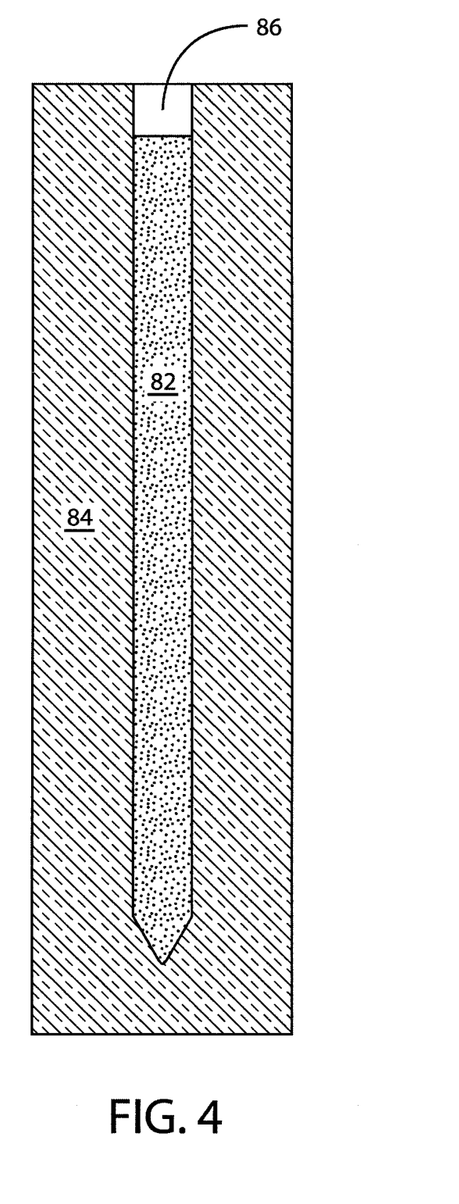
FIG. 4 shows a cross-sectional view of a mold having a cavity that contains a powder mixture for formation of a reactant structure, according to an embodiment of the present invention.
Figure 5:
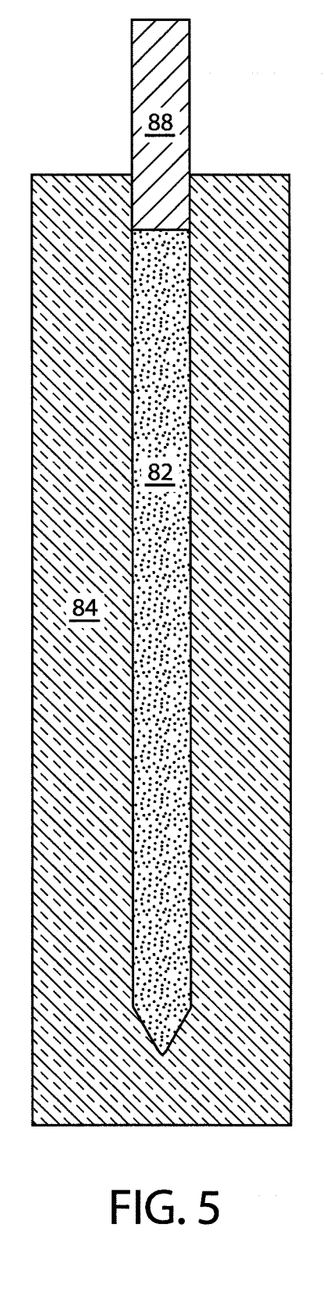
FIG. 5 shows a cross-sectional view of a ram compressing the powder mixture of FIG. 4 in the mold cavity.

As shown in FIG. 4, the container may be a mold 84 with a generally cylindrical cavity 86. The powder mixture 82 may be inserted into the cavity 86 and the mold 84 may be vibrated to facilitate an even distribution of the powder mixture 82 within the cavity 86. The powder mixture 82 may then be compressed. As shown in FIG. 5, a ram 88 may be used to compress the powder mixture 82 within the mold 84. In an additional embodiment, the container may be flexible so as to be itself compressible, and the powder mixture 82 may be isostatically pressed within the mold 84 by a pressurized fluid surrounding the compressible container (not shown).

The compressed powder mixture 82 may then be heated, such as in a furnace (not shown), to an elevated temperature sufficient to cause particles of the powder mixture 82 to adhere to one another. In some embodiments, the compressed powder mixture 82 may be heated to a temperature that is below the melting temperature of any of the powdered chemical reactants, but that is sufficiently high to cause solid state sintering. In additional embodiments, the powder mixture 82 may be heated to a temperature that is above the melting point of at least one of the powdered chemical reactants to cause a liquid state sintering. The resulting reactant structure 20-23 may then be cooled and optionally sized and shaped, such as by hand tools or by machining, for example, the reactant structure 20-23 may be turned on a lathe.

Reactors 10 and reactant structures 20-23, such as described herein, may be utilized in methods of chemically converting at least one reactant into at least one product. In some embodiments, such methods may include directing combustion gases into a reaction chamber 12, forming a flame in the reaction chamber 12, forming a plasma in the reaction chamber 12 and gradually feeding at least one elongated electrically conductive reactant structure 20-23 comprised of the at least one reactant into the plasma to chemically convert the at least one reactant to the at least one product. The act of gradually feeding the reactant structures 20-23 into the plasma may include, for example, any of continuously feeding the reactant structures 20-23 into the plasma, incrementally feeding the reactant structures 20-23 into the plasma, and intermittently feeding the reactant structures 20-23 into the plasma, but is not limited to these acts.

To prepare the reactor 10 to chemically convert one or more reactants to one or more products, a portion of each reactant structure 20-23 may be positioned initially within each reactant feed assembly 16-19 of the reactor 10. In view of this arrangement and during operation, the plurality of reactant structures 20-23 may be fed into the reaction chamber 12 by the reactant feed assemblies 16-19 and, to provide a significant volume of reactant material, may extend from outside of the reaction chamber 12 into the reaction chamber 12. In some embodiments, some of the reactant structures 20-23 may comprise one or more chemicals that are not present in other reactant structures 20-23 of the plurality of reactant structures 20-23 extending into the reaction chamber 12.

In some embodiments, some reactant structures 20-23 may comprise graphite and a sodium borate, while other reactant structures 20-23 may be comprised essentially of graphite and not include sodium borate. For example, as shown in FIG. 1, a first set of reactant structures 20, 21 of a planar arrangement of reactant structures may be comprised essentially of graphite and at least a second set of reactant structures 22, 23 of the planar arrangement may comprise graphite and at least another reactant. In an additional embodiment, as shown in FIG. 2, a first set of reactant structures 20, 21 may be comprised essentially of graphite and at least a second set of reactant structures 22, 23, which may be positioned at a different longitudinal location, such as longitudinally below the first set of reactant structures 20, 21, may comprise a composite material comprising graphite and at least another reactant. For example, the at least a second set of reactant structures 22, 23 may be comprised of graphite and a sodium borate, such as described previously herein, and may also include sodium hydroxide. Additionally, the at least a second set of reactant structures 22, 23 may be comprised of graphite and an oxide. In further embodiments, each of the reactant structures 20-23 may have substantially the same chemical composition.

Combustion gases may be introduced into the combustion chamber 12 through the combustion torch 14 after inner end portions of the reactant structures 20-23 have been positioned therein. For example, a hydrocarbon fuel, such as at least one of methane, butane and propane gas, and oxygen may be directed into the combustion chamber 12 by the combustion torch 14. One or more of the reactant structures 20-23 may then be electrically energized by one or more power supplies 28 and an arc may be formed between at least one set of reactant structures 20-23. In some embodiments, an initial arc may be contact started to ignite the combustion gases. For example, a set of reactant structures 20, 21 comprised essentially of graphite may be placed into contact with one another and electrically energized and then separated to initiate an arc and ignite the combustion gases to form a flame, prior to the energizing of any other reactant structures 22, 23, such as reactant structures 22, 23 comprising graphite and another reactant. After the flame is formed, each of the remaining sets of reactant structures 22, 23 may be energized and may form an electric arc therebetween and a plasma may be formed within the reaction chamber 12.

After the plasma is formed in the reaction chamber 12, the chemical reactant that forms the reactant structures 20-23 may be consumed by a chemical reaction and at least one product may be formed. As each of the reactant structures 20-23 are consumed, the reactant feed assemblies 16-19 may be initiated to feed the remaining portions of reactant structure 20-23 into the reaction chamber 12. For example, the reactant feed assemblies 16-19 may simultaneously feed a first reactant structure 20 and 22 and at least a second reactant structure 21 and 23 of a set of reactant structures 20, 21 and 22, 23 into the reaction chamber 12 at a rate that substantially compensates for the consumption of the reactant structures 20-23. In view of this, the inner ends of the reactant structures 20-23 may be maintained at substantially the same position and a relatively consistent arc may be maintained between the reactant structures 20, 21 and 22, 23.

In some embodiments, sensors (not shown) may be utilized to determine one or more operational characteristics associated with the reactor 10 such as, for example, the temperature of one or more components of the reactor 10 or the feed rate of reactant structures 20-23 being introduced into and processed by the reactor 10. Similarly, sensors or other appropriate devices may be utilized to determine various electrical characteristics of the power being supplied to reactant structures 20-23.

Additionally, a control system (not shown) may be employed in communication with various components of the reactor 10 for collection of information from, for example, the various sensors and for control of, for example, one or more of the power supplies 28, the cooling system 30 and the reactant feed assemblies 16-19, as desired.

The control of the actuators of the reactant feed assemblies 16-19 may be responsive, for example, to measured current and voltage values provided by one or more of the electrical power sources 28 which may be coupled to the reactant structures 20-23. Based on the current and voltage measurements taken, individual reactant structures 20-23 of a given set of reactant structures 20, 21 and 22, 23 may be displaced into reaction chamber 12, as discussed above, to maintain the gap or distance therebetween as the reactant structures 20-23 are consumed. Continual monitoring of the voltage and/or current and attendant adjustment of the reactant structures 20-23 may enable a more efficient arc production by the reactant structures 20-23. Additionally, during startup, the actuators may be controlled so as to define a smaller gap among one or more sets of reactant structures 20, 21 and 22, 23 to provide easier startup of the reactor 10. Upon establishment of an arc, the reactant structures 20-23 may be repositioned by reactant feed assemblies 16-19 for optimal performance during normal operation.

There may be several advantages to using the energized reactant structures 20-23 to generate the plasma arc within the reaction chamber 12, rather than traditional electrodes. For example, the reactant structures 20-23 do not require cooling and may be operated at an increased temperature than is conventional, which may provide a more energy efficient reactor 10. Additionally, insulation may be provided in the reaction chamber 12, which may decrease the heat energy lost from the reaction chamber 12 and decrease the cooling required for the double-walled enclosure 36 of the reaction chamber 12, which may further improve the energy efficiency of the reactor 10. The increased operating temperature of the reactant structures 20-23 over traditional electrodes may also prevent the condensation of water vapor within the reaction chamber 12 and on the reactant structure 20-23 surfaces and may improve the reliability of the arc. Furthermore, the plasma arc may be free burning and, thus may not require containment within an arc channel that may require cooling, may react with the chemicals of the reaction, and may become damaged during operation, as is the case with conventional reactors.

In some embodiments, some of the reactant structures 20-23 may be energized and form the plasma arc in the reaction chamber 12 as they are consumed by a reaction, while other reactant structures 20-23 may be fed into the plasma and consumed in a chemical reaction without being electrically energized and without forming an arc with another reactant structure 20-23.

The combustion gases may also provide reactants that may be used to form a desired product. However, in additional embodiments, the combustion gases may not provide reactants that are necessary to the chemical reaction that provides a desired product. For example, each of the chemical components of the chemical composition of the desired product may be provided solely by the reactant structures 20-23.

In some embodiments, the combustion gases may comprise methane and oxygen and the combustion reaction may comprise the following reaction:

$$CH_4 + 2O_2 \rightarrow CO_2 + 2H_2O$$

In some embodiments, the combustion gas products may then be reduced by the carbon (e.g., graphite) of one or more reactant structures.

Methods that form sodium borohydride may comprise gradually feeding at least one elongated electrically conductive reactant structure 20-23 comprised of graphite and a borate salt into the plasma to chemically convert the graphite and the borate salt to a borohydride and at least another product.

In some embodiments, at least one reactant structure 20-23 comprised of graphite and sodium borate may be fed into the plasma to chemically convert the graphite and sodium borate to sodium borohydride and at least another product. For example, at least one reactant structure 20-23 comprised of graphite, hydrated borax and sodium hydroxide may be fed into the plasma to chemically convert the graphite, hydrated borax and sodium hydroxide to sodium borohydride, hydrogen and carbon monoxide, such as by the following reaction:

$$Na_2B_4O_7 \cdot 10H_2O + 2NaOH + 19C \rightarrow 4NaBH_4 + 3H_2 + 19CO$$

In additional embodiments, at least one reactant structure 20-23 comprised of graphite and hydrated sodium metaborate may be fed into the plasma to chemically convert the graphite and hydrated sodium metaborate to sodium borohydride hydrogen and carbon monoxide, such as according to the following reaction:

$$NaBO_2 \cdot 4H_2O + 6C \rightarrow NaBH_4 + 2H_2 + 6CO$$

In yet additional embodiments, at least one reactant structure 20-23 comprised of graphite and an oxide may be fed into the plasma to chemically convert the graphite and an oxide to a carbide and at least another product, such as carbon monoxide. For example, at least one reactant structure 20-23 comprised of graphite and at least one of silicon oxide, titanium oxide and zirconium oxide may be fed into the plasma to form at least one of silicon carbide, titanium carbide and zirconium carbide and at least another product, such as by one or more of the following reactions:

$$SiO_2 + 3C \rightarrow SiC + 2CO$$

$$TiO_2 + 3C \rightarrow TiC + 2CO$$

$$ZrO_2 + 3C \rightarrow ZrC + 2CO$$

After the reactants have been chemically reacted to form one or more products, the products may be directed through an exit port 34 at the bottom of the reaction chamber 12. Additionally, products may collect within the reaction chamber 12, such as at the bottom of the reaction chamber 12. The products that are directed out of the reaction chamber 12 may be directed into a cyclone 60, which may be used to separate relatively larger solid product particles from gaseous products. Then, the gaseous products and any remaining solid product particles may be directed to the filter 62 and remaining particulates may be captured by the filter 62.

Although this invention has been described with reference to particular embodiments, the invention is not limited to these described embodiments. Rather, the invention is limited only by the appended claims, which include within their scope all equivalent devices, systems and methods according to the principles of the invention as described.

What is claimed is:

1. A combustion flame-plasma hybrid reactor system comprising:
    a reaction chamber;
    a combustion torch positioned to direct a flame into the reaction chamber;
    a plurality of electrically conductive solid reactant structures, a set of the plurality of electrically conductive solid reactant structures electrically coupled to a power supply and comprising a different reactant than another set of the plurality of electrically conductive solid reactant structures electrically coupled to another power supply, wherein the set of the plurality of electrically conductive solid reactant structures and the another set of the plurality of electrically conductive solid reactant structures are positioned on substantially the same longitudinal position relative to the reaction chamber; and
    a plurality of reactant feed assemblies configured to electrically energize at least a portion of the plurality of electrically conductive solid reactant structures to form a plasma and to feed the plurality of electrically conductive solid reactant structures into the plasma to form at least one product.

2. The combustion flame-plasma hybrid reactor system of claim 1, wherein each of the plurality of electrically conductive solid reactant structures comprises graphite.

3. The combustion flame-plasma hybrid reactor system of claim 2, wherein each electrically conductive solid reactant structure of the set further comprises a sodium borate.

4. The combustion flame-plasma hybrid reactor system of claim 3, wherein the sodium borate comprises at least one of hydrated borax and hydrated metaborate.

5. The combustion flame-plasma hybrid reactor system of claim 4, wherein each electrically conductive solid reactant structure of the set further comprises sodium hydroxide.

6. The combustion flame-plasma hybrid reactor system of claim 2, wherein each electrically conductive solid reactant structure of the set further comprises at least one of silicon oxide, titanium oxide, and zirconium oxide.

7. The combustion flame-plasma hybrid reactor system of claim 2, wherein each of the plurality of electrically conductive solid reactant structures is comprised essentially of reactants.

8. The combustion flame-plasma hybrid reactor system of claim 7, wherein each of the plurality of electrically conductive solid reactant structures comprises a substantially cylindrical elongated body.

9. The combustion flame-plasma hybrid reactor system of claim 8, wherein the substantially cylindrical elongated body of each of the plurality of electrically conductive solid reactant structures extends from outside of the reaction chamber into the reaction chamber.

10. The combustion flame-plasma hybrid reactor system of claim 1, wherein the reaction chamber comprises a double-walled enclosure having an outer wall and an inner wall, the outer wall and the inner wall defining a coolant reservoir therebetween.

11. The combustion flame-plasma hybrid reactor system of claim 10, further comprising a thermally insulating lining substantially covering an inner surface of the inner wall of the double-walled enclosure of the reaction chamber.

12. The combustion flame-plasma hybrid reactor system of claim 11, wherein the thermally insulating lining comprises a substantially tubular ceramic insert.

13. The combustion flame-plasma hybrid reactor system of claim 1, wherein the combustion torch is fluidly coupled to a hydrocarbon fuel supply.

14. The combustion flame-plasma hybrid reactor system of claim 1, wherein at least one of the plurality of reactant feed assemblies comprises at least one of a step motor and a servo motor.

15. The combustion flame-plasma hybrid reactor system of claim 1, wherein each electrically conductive solid reactant structure of the set consists essentially of graphite and at least one other reactant, and wherein each electrically conductive solid reactant structure of the another set consists essentially of graphite.

16. The combustion flame-plasma hybrid reactor system of claim 1, further comprising insulating sleeves positioned directly adjacent each of the plurality of electrically conductive solid reactant structures.

17. The combustion flame-plasma hybrid reactor system of claim 1, wherein each electrically conductive solid reactant structure of the set comprises a sintered powder mixture of graphite and at least one other reactant.

18. The combustion flame-plasma hybrid reactor system of claim 17, wherein each electrically conductive solid reactant structure of the another set consists essentially of graphite.

19. The combustion flame-plasma hybrid reactor system of claim 17, wherein the at least one other reactant comprises a sodium borate, silicon oxide, titanium oxide, or zirconium oxide.

20. The combustion flame-plasma hybrid reactor system of claim 17, wherein the at least one other reactant comprises at least one of hydrated borax and hydrated metaborate.

21. The combustion flame-plasma hybrid reactor system of claim 17, wherein the at least one other reactant comprises a sodium borate and sodium hydroxide.

22. The combustion flame-plasma hybrid reactor system of claim 1, further comprising a cooling system configured to cool the reaction chamber without substantially cooling the plurality of electrically conductive solid reactant structures.

23. The combustion flame-plasma hybrid reactor system of claim 1, wherein the set of the plurality of electrically conductive solid reactant structures comprises at least two opposing electrically conductive solid reactant structures of the plurality of electrically conductive solid reactant structures.

* * * * *